United States Patent
Hesse

(10) Patent No.: US 10,945,383 B2
(45) Date of Patent: Mar. 16, 2021

(54) ROTATING ARM TO COVER GREENHOUSES AND METHOD OF USE

(71) Applicant: Americover, Inc., Escondido, CA (US)

(72) Inventor: Robert "Bob" J Hesse, Volga, SD (US)

(*) Notice: Subject to any disclaimer, the term of this patent is extended or adjusted under 35 U.S.C. 154(b) by 490 days.

(21) Appl. No.: 16/006,071

(22) Filed: Jun. 12, 2018

(65) Prior Publication Data
US 2019/0090435 A1  Mar. 28, 2019

Related U.S. Application Data

(60) Provisional application No. 62/562,961, filed on Sep. 25, 2017.

(51) Int. Cl.
*A01G 9/24* (2006.01)
*A01G 9/22* (2006.01)

(52) U.S. Cl.
CPC ............ *A01G 9/242* (2013.01); *A01G 9/22* (2013.01)

(58) Field of Classification Search
CPC ............ A01G 9/22; A01G 9/24; A01G 9/242
See application file for complete search history.

(56) References Cited

U.S. PATENT DOCUMENTS

| | | | | |
|---|---|---|---|---|
| 544,871 A * | 8/1895 | Turner | .................... | E04H 15/04 135/90 |
| 4,348,833 A * | 9/1982 | Nagoya | ................... | A01G 9/242 47/17 |
| 4,387,533 A * | 6/1983 | Green | ...................... | A01G 9/22 47/17 |
| 5,038,517 A * | 8/1991 | Talbott | ................... | A01G 9/242 47/17 |
| 5,212,903 A * | 5/1993 | Talbott | ................... | A01G 9/242 47/17 |
| 5,564,234 A * | 10/1996 | Vermeulen | ............. | A01G 9/242 52/63 |
| 6,260,308 B1 * | 7/2001 | Looney | ................... | A01G 9/227 52/63 |
| 6,324,792 B1 * | 12/2001 | DeGarie | .................. | E04B 7/10 403/217 |
| 6,843,019 B2 * | 1/2005 | Mercurio | ................ | A01G 9/242 47/17 |
| 8,413,385 B2 * | 4/2013 | Mahoney | .............. | E04H 1/1238 52/36.2 |
| 8,695,281 B2 * | 4/2014 | Dondurur | ............... | E04D 13/16 52/3 |
| 9,212,503 B1 * | 12/2015 | Mentch | .................... | A01G 9/22 |
| 9,241,447 B2 * | 1/2016 | Looney | ................... | A01G 9/242 |

(Continued)

FOREIGN PATENT DOCUMENTS

EP  1927705 A1 *  6/2008  .......... E04F 10/0666

*Primary Examiner* — Monica L Barlow
*Assistant Examiner* — Aaron M Rodziwicz
(74) *Attorney, Agent, or Firm* — Eric Hanscom

(57) ABSTRACT

This invention is directed toward a rotating arm that can quickly and easily cover and uncover a greenhouse. The invention comprises a base unit to which is attached a rotating arm. The base unit is secured into cement and the rotating arm unit is attached at its end to a tarp. As a worker rotates the arm, the greenhouse tarp is quickly moved in the direction or rotation. A greenhouse with one of these inventions at either end can be covered and uncovered by a single person in a matter of seconds and removes the need for the motors and complicated apparatus associated with the prior art.

12 Claims, 6 Drawing Sheets

(56) References Cited

U.S. PATENT DOCUMENTS

| | | | | |
|---|---|---|---|---|
| 9,642,315 B2* | 5/2017 | Lloyd | ............... | A01G 9/227 |
| 10,251,346 B2* | 4/2019 | Lloyd | ............... | A01G 9/22 |
| 2004/0035059 A1* | 2/2004 | Meyer | ............... | A62C 2/10 |
| | | | | 52/1 |
| 2005/0103371 A1* | 5/2005 | Childres | ............ | A45B 23/00 |
| | | | | 135/97 |
| 2005/0285011 A1* | 12/2005 | Harwood | ......... | E04H 12/2261 |
| | | | | 248/519 |
| 2007/0180780 A1* | 8/2007 | Foglia | ............ | E04B 1/4107 |
| | | | | 52/92.2 |
| 2008/0256854 A1* | 10/2008 | McIlvenna | .......... | A01G 9/22 |
| | | | | 47/29.5 |
| 2014/0157662 A1* | 6/2014 | Wallace | ............ | A01G 9/241 |
| | | | | 47/17 |
| 2016/0262318 A1* | 9/2016 | Lloyd | ............ | E04F 10/0614 |
| 2017/0071139 A1 | 3/2017 | Fence | | |

\* cited by examiner

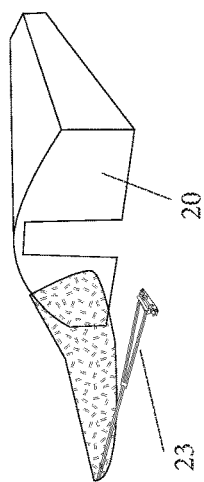
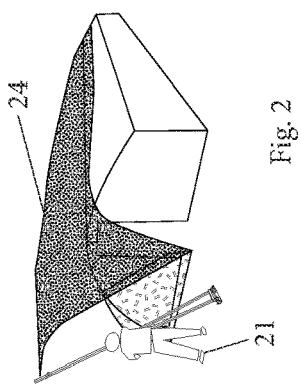
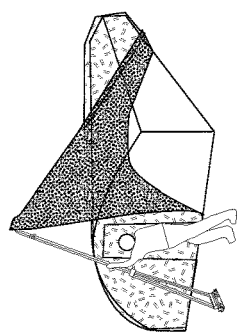
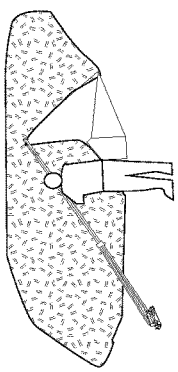
Fig. 2

ROTATING ARM TO COVER GREENHOUSES AND METHOD OF USE

CROSS REFERENCE TO RELATED APPLICATIONS

This application claims priority back to U.S. Provisional No. 62/562,961, filed 25 Sep. 2017.

STATEMENT REGARDING FEDERALLY SPONSORED RESEARCH OR DEVELOPMENT

This invention was not federally sponsored.

REFERENCE NUMBERS USED

1. Base (generally)
2. Base Plate
3. Base Plate hole
4. J Bolt
5. Bolt washer
6. Base nut
7. Hinge rod
8. End washer
9. Cotter Pin
10. Base knuckle
20. Greenhouse
21. Worker
22. Tarp
23. Arm (generally)
31. A-frame
32. Center Arm
33. L-Arm
35. Arm Bolt
36. Vinyl padded tube.
37. Arm knuckle.

BACKGROUND OF THE INVENTION

Field of the invention: This invention relates to general field of greenhouses and greenhouse covering devices, and more specifically to a combination of a base unit secured in cement that has removably secured to it a rotating arm that quickly and easily cover and uncover a greenhouse. The invention can be operated by a single person in a matter of seconds and removes the need for the motors and complicated apparatus associated with the prior art.

Greenhouses have been used for growing plants since the 1800's. Indeed, the Romans understood the benefits of environmental control and would move plants out into the sun during the day, then wheel them back into a warm room during the cold evenings. Today, greenhouses are used for everything from starting plant seedlings to growing exotic plants in locations where they would not normally grow. However, the biggest use of greenhouses currently is to control the environment such that a grower can control one of more aspects of plant growth—most notably the flowering and fruiting cycles and to promote growth by controlling the temperature and light availability.

In industries where controlling the light that a plant receives is important to successful growing a crop, the most common means by which this is achieved is by covering the green house with a light-depriving cover or tarp for the number of hours a grower wishes for his or her plants to be in darkness. When growers want their plants to receive light, they remove the tarp; when they want their plant to be deprived of light, they cover the greenhouse with the tarp.

One major problem faced by growers using tarps is how to put the tarps on and take them off. While this may sound like a painfully simple issue, the size of the greenhouse makes this a very difficult task. Because almost all commercial greenhouses are over 10' in height and over 20' in width, humans cannot just lift the edge of a tarp and move it over the greenhouse, rather, it requires some sort of mechanical device to get the tarp over the top of the greenhouse.

The prior art has several examples of attempts to resolve this problem. For example, U.S. Pat. No. 9,241,447 to Looney teaches a pivot arm upon which the tarp is rolled and unrolled. When growers wish to cover their greenhouse, they can pull Looney's pivot arms to the sides and the tarp unfurls. However, Looney relies on electrical motors to furl and unfurl the covers, which makes the system dependent on electricity, and the system lacks a suitable anchoring means, so that the entire system could be blown away in high winds.

There are also a number of patents that teach some aspect of a cover that is secured to the top of the greenhouse, then unfurled, again with an electric motor, when the grower wants to cover the greenhouse. For example, U.S. Pat. No. 9,642,315 to Lloyd, U.S. Pat. No. 6,843,019 to Mercurio and Mercuirio, and US Application No. 20170071139 to Fence and Kern all teach a cover where the furled cover sits on the top roof or the of the greenhouse, and is selectively unfurled during times when darkness is desirable. Because these inventions also require some combinations of furling devices and motors, they, like the invention taught by the Looney patent, are dependent upon a reliable source of electricity and subject to mechanical breakdown. By mounting the entire assemble on top of the greenhouse, these inventions also provide shade throughout the times when the grower wants full sunlight.

Thus there has existed a long-felt need for a product that can cover and uncover a greenhouse quickly, efficiently, and successfully, requires no electricity and can be easily handled by one or more humans, is solidly grounded such that there is no danger that it will be blown away by high winds, and is sturdy enough such that the risk of malfunction of breakage is miniscule.

The current invention provides just such a solution by providing a rotating arm that is attached to a corner of the tarp or cover at the top of the arm. The rotating arm is firmly anchored to the ground with a base unit that is secured by cement through a number of J-bolts that have had their "J" end sunk into the wet cement and are secured to the base unit by washers and nuts through holes in base unit. The arm has been removably attached to the base through sets of hinge knuckles on the arm and the base, through which a pin or hinge rod as it is called in this application is inserted. The hinge rod is held in place by washers and cotter pins. The arm has three distinct parts. First, an A-frame contains the knuckles that mate with the knuckles on the base. A Center Arm connects the A-frame to the third pat, the L-Arm which connects to the tarp with a vinyl padded tube, which reduces wear and tear on the tarp. The Center Arm is adjustable such that the diameter of the invention's rotation can be changed to fit a particular greenhouse.

To use the invention, a person attaches the tarp to the arm, and rotates the arm through a 180-degree rotation, thereby pulling the tarp all the way over the greenhouse. One worker working alone would then walk to the other end of the greenhouse, repeat the procedure, then walk along the edge of the greenhouse pulling down the rest of the tarp. Removing the tarp is equally simple. The user merely rotates the arm 180 degrees back in a reverse direction to move the tarp back off the greenhouse.

The currently invention can be effectively used by one person, does not require electricity or motors, does not require any complex furling machines, allows for complete exposure to sunlight during times when full sunlight is desirable, and is inexpensive, durable and easy to install.

OBJECTS OF THE INVENTION

It is therefore an object of the present invention to provide a solidly anchored, easy to use means by which a tarp can be placed over, and removed from, a greenhouse.

Additional objects of the invention include providing a means of covering and uncovering a greenhouse with a tarp for the purposes of controlled light deprivation where:

The means does not require electricity or mechanical motors.

The means does not require any moving, spring-loaded machinery such as spring-loaded furling devices.

The means is usable by a single person without additional human or mechanical help.

The means provides a quick and easy way to cover a greenhouse.

The means has an anchor that is sunk into concrete.

The means has an adjustable arm which can change the diameter of the rotation of the trap depending on the height and width of the greenhouse.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings

FIG. 2 is a sequential view of a worker using the invention to uncover a greenhouse.

DETAILED DESCRIPTION OF THE FIGURES

Figure 1:
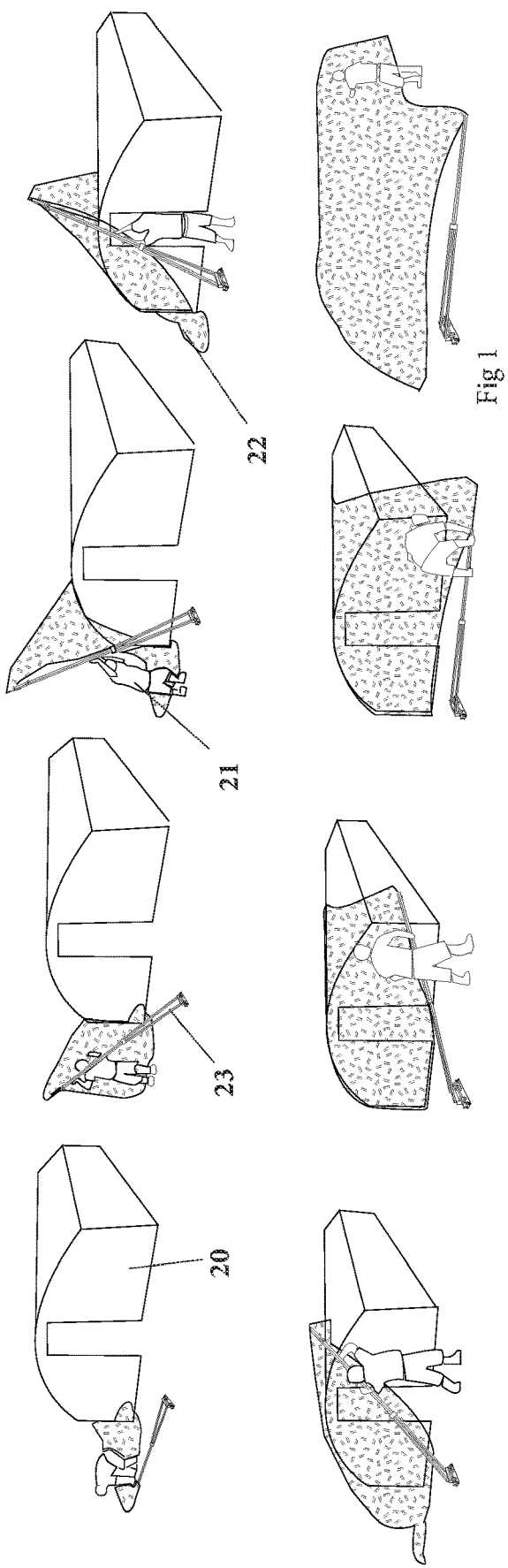
FIG. 1 is a sequential view of a worker using the invention to cover a greenhouse.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting. The reference numbers are listed at the beginning of this application.

FIG. 1 is a sequential view of a worker using the invention to cover a greenhouse. The arm 23 has already been secured in cement (not shown in this figure) so that it can rotate freely. The worker 21 picks up the arm 23 and rotates it over the greenhouse 20, dragging the tarp 22 behind it. It is important to note that the arm 23 rotates along a fixed arc because the hinged connection between the arm and the base.

FIG. 2 is a sequential view of a worker using the invention to uncover a greenhouse. In this figure, the worker 21 picks up the arm 23 and pulls it back in the opposite direction as in FIG. 1, thereby pull the tarp 22 off the greenhouse. It should be noted that with an arm 23 at either end of a greenhouse, the greenhouse can be covered and uncovered by a single worker in a very short period of time.

Figure 3:
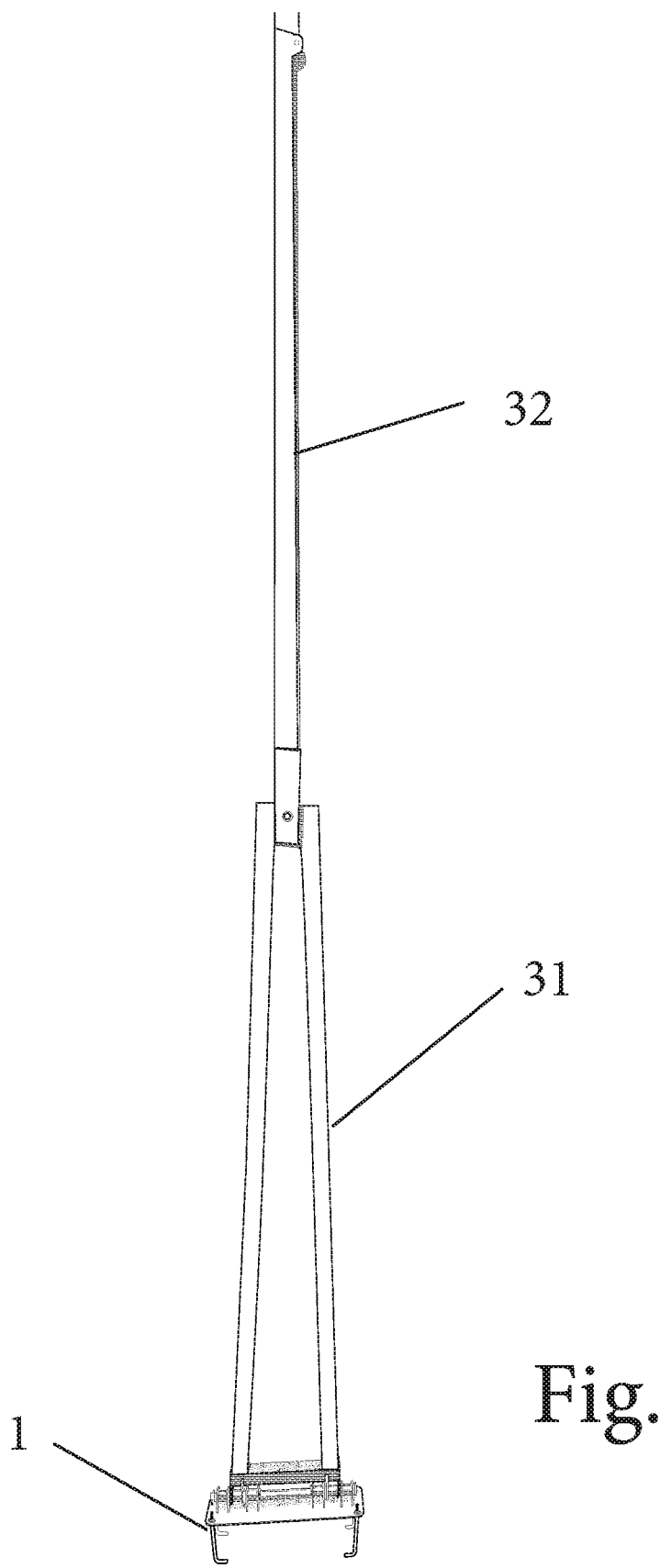
FIG. 3 is a front view of the arm portion of the invention, showing the lower part of the invention.
Figure 4:
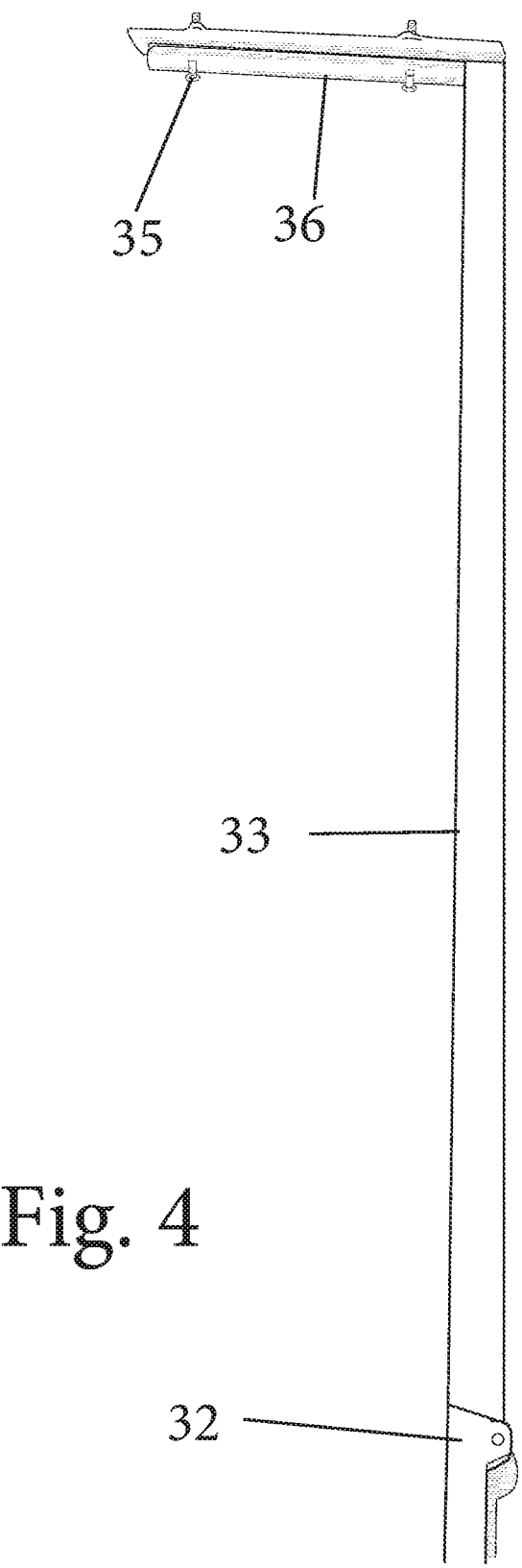
FIG. 4 is a front view of the arm portion of the invention, showing the upper part of the invention.

FIG. 3 is a front view of the arm portion of the invention. FIG. 4 is a front view of the arm portion of the invention, showing the upper part of the invention.

The A-frame 31 is connected to the base (generally 1) by a rotatable hinge. The arm needs to extend outward so as to swing the tarp on and off a greenhouse which can be significantly taller than the worker doing the covering and uncovering, so a center arm 32 extends the reach of the arm. At the end of the center arm 32 is an L-Arm 33, which not only further extends the diameter of the "sweep" of the arm, but also has at its end the means by which a corner of a tarp is attached. The L-Arm 33 has a bend at the top, which defines a semicircular cavity, into which the vinyl-padded tube 36 attaches to hold a corner of the tarp in place, using arm bolts 35 to secure the tarp in between the vinyl-padded tube 36 and the semicircular cavity in the L-arm 33.

Figure 5:
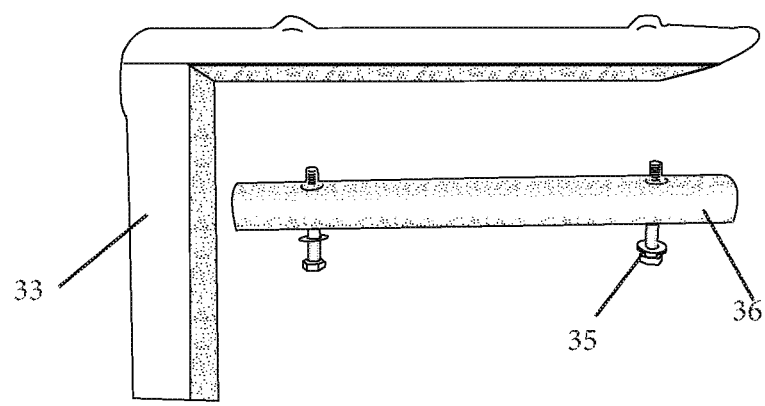
FIG. 5 is a side perspective view of the end of the "L-Arm" to which a corner of the tarp is attached.

FIG. 5 is a side perspective view of the end of the "L-Arm" 33 to which a corner of the tarp is attached by inserting a corner of a tarp under the vinyl-padded tube 36, which is then tightened against the L-Arm through arm bolts 35. The upper portion of the L-Arm has a semicircular indentation, into which the vinyl padded tube 36 mates, thereby securing the tarp.

Figure 6:
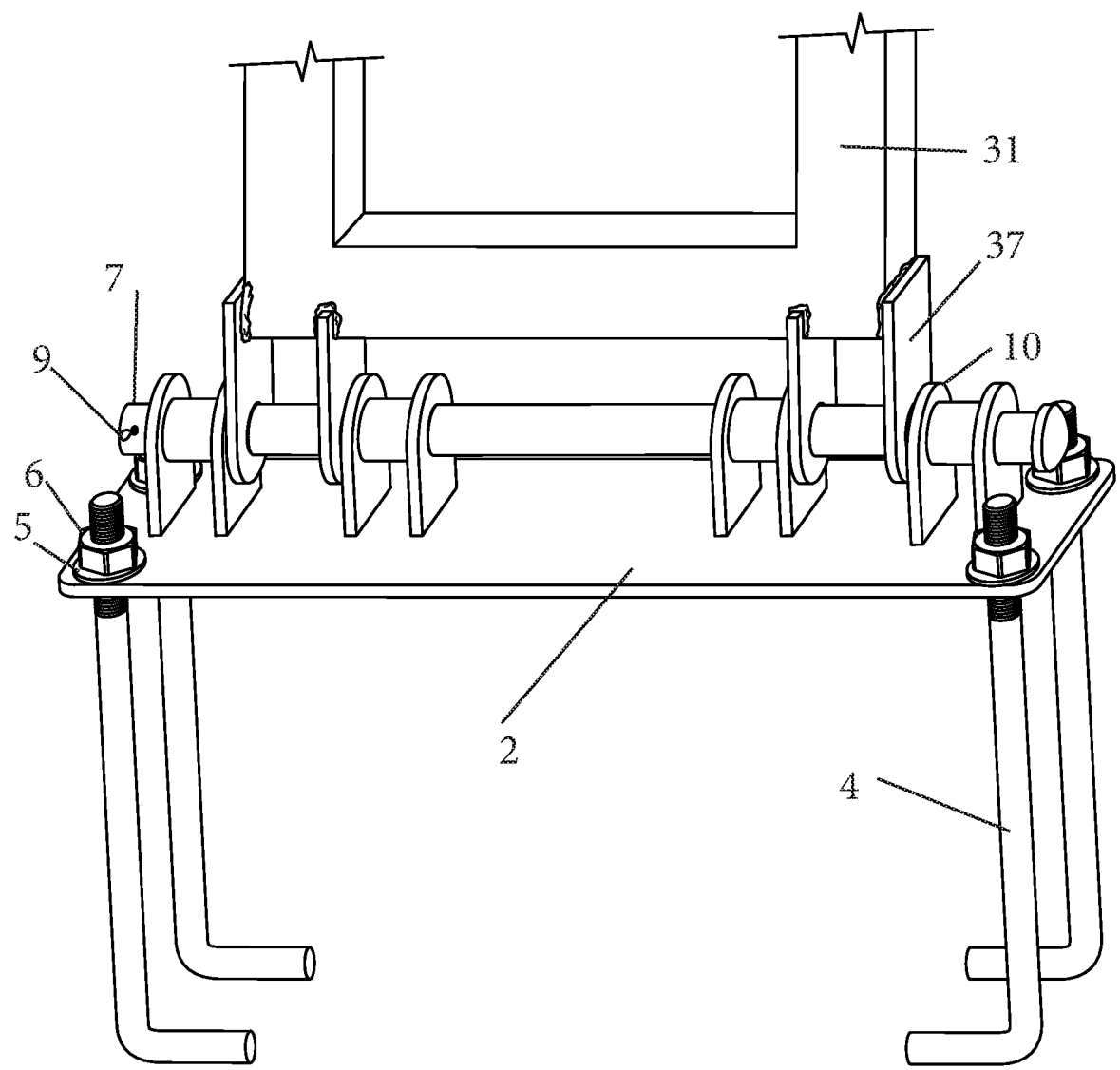
FIG. 6 is front, perspective view of the base unit and the connection between the base unit and the arm unit.

FIG. 6 is front, perspective view of the base unit and the connection between the base unit and the arm unit. The base unit, 1 generally, as a base plate 2 which has four base plate holes 3. There are four J-bolts 4 which are inserted through the base plate holes 3 and secured by bolt washers 5 and base nuts 6. The base is sunk into cement such that the "J" portion of the J-bolts 4 are anchored into the cement, pointing the base knuckles 10 up to the air. The hinge rod 7 will slide through holes in the base knuckles 10 and arm knuckles (37 in other drawings), to create a hinge that allows the arm to rotate freely, but securely. the mating of the knuckles of the base and the arm portions, which allow for the easy rotation of the arm portion The A-frame rotatably mates with the base 2 through knuckles on the arm and base units. The base knuckles 10 are rotatably connected to the arm knuckles 37 through the hinge rod 7 and goes through circular holes in both sets of knuckles. The hinge rod 7 is secure with a cotter pin 9 and end washer 8. The J-bolt 4 has been secured to the base unit by inserting it through a base plate hole and attaching a bolt washer 5 and a base nut 6 to the threaded end of the J-bolt. The "J" end of the J-bolt can be inserted into wet concrete up to the base plate 2, and allowed to dry. The base plate 2 can be tightened against the dry concrete by tightening the base nut 6, thereby securing the base unit to a large, dried concrete footing. The hinge rod 7 goes through holes in the base knuckles 10, and is secured at its end by a cotter pin 9 and end washer 8, showing the base plate 2 and a hole that extends through all of the base knuckles 10.

Function of the Invention

The first part of this invention is a base unit (generally referenced as 1). The base 1 comprises a base plate 2, which has four Base Plate Holes 3. On the top of the base plate 2 are base knuckles 10, which later in the construction process will be mated with arm knuckles 37 on the A-frame 31 portion of the arm.

Four J Bolts 4 and pulled up through the base plate holes 3 and secured with Bolt Washers 5 and Base Nuts 6, such that the "J" section of the J Bolt 4 is pointing down from the base plate 2. A rectangular hole is then dug in front of each of the greenhouse, using around 5-6 60-pound bags of quick cement. The base 1 is then pressed into the cement until the bottom of base plate 2 is resting on the top of the cement. A temporary plastic cover (not shown in these figures) is then placed loosely over the hole and the cement is allowed to cure for three to seven days. Once the cement is cured, it secures the base 1 as the J end of the J bolts 4 are constrained by the now solid cement.

Once the base 1 is secured to the group, the arm unit (generally referenced as 30) is created and rotably attached to the base 1. The arm has three distinct parts. First, an A-frame 31 contains the arm knuckles 37 at its lower end that mate with the base knuckles 10 on the base 1. A Center Arm 32 connects the A-frame 31 to the third pat, the L-Arm 33 which connects to the tarp with a vinyl padded tube 36, which reduces wear and tear on the tarp. The Center Arm 32 is adjustable such that the diameter of the invention's rotation can be changed to fit a particular greenhouse. To attach the arm 30 to the base 1, the base knuckles 10 are aligned and mated to the arm knuckles 37, and a Hinge Rod 7 is inserted through both the arm knuckles 37 and base knuckles 10, thereby both securing the arm 30 to the base 1 and allowing the arm to freely rotate. The hinge rod 7 is held in place by end washers 8 and cotter pins 9.

To use the invention, a person attaches the tarp to the arm 30 using the vinyl padded tube 36, and rotates the arm through a 180-degree rotation, thereby pulling the tarp all the way over the greenhouse. One worker working alone would then walk to the other end of the greenhouse, repeat the procedure, then walk along the edge of the greenhouse pulling down the rest of the tarp. Removing the tarp is equally simple. The user merely rotates the arm 30 180 degrees back in a reverse direction to move the tarp back off the greenhouse. Because the arm 30 is solidly secured to the base 1 through the J bolts 4 in cement, should a strong wind hit, it is much less likely that the invention will be torn off the greenhouse (as in the prior art) and both the structure and the tarp blown away.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

That which is claimed:

1. A device for covering and uncovering greenhouses, consisting of: a tarp, a base, an arm, a means of connecting the arm to the tarp, and a means of connecting the base to the arm, where the base comprises a base plate, where the base plate additionally comprises four base plate holes, at least one J bolt, at least one bolt washer, at least one base nut, and at least one base knuckle, where the at least one J bolt is inserted through one of the four base plate holes and secured with the at least one bolt washer and at least one base nut, where the base is secured to the ground through an insertion of the four J bolts into a hole, where the hole has been filled with a quantity of wet cement, where the quantity of wet cement has been allowed to dry, thereby securing the at least one J bolt, where the arm comprises an A-frame and an L-Arm, were the A-frame additionally comprises at least one arm knuckle and the L-Arm additionally comprises at least one padded tube, where the at least one padded tube has means to secure an end of the tarp, where the arm additionally comprises a Center Arm, where the center arm has a bottom and a top, and the bottom of the center arm attaches to a top of the A-frame, and the top of the center arm attaches to a bottom of the L-Arm.

2. The device of claim 1, where the center arm is adjustable, and where the padded tube is constructed from vinyl.

3. The device of claim 2, where the base additionally comprises a hinge rod, where the hinge rod is inserted through the last least one base knuckle and the at least one arm knuckle to allow the arm to rotate freely while being securely attached to the base, and where the hinge rod is secured by a cotter pin and an end washer.

4. A device for covering and uncovering greenhouses, comprising: a tarp, a base, an arm, a means of connecting the arm to the tarp, and a means of connecting the base to the arm, where the base comprises a base plate, where the base plate additionally comprises four base plate holes, at least one J bolt, at least one bolt washer, at least one base nut, and at least one base knuckle, where the at least one J bolt is inserted through one of the four base plate holes and secured with the at least one bolt washer and at least one base nut, where the base is secured to the ground through an insertion of the four J bolts into a hole, where the hole has been filled with a quantity of wet cement, where the quantity of wet cement has been allowed to dry, thereby securing the at least one J bolt, where the arm comprises an A-frame and an L-Arm, were the A-frame additionally comprises at least one arm knuckle and the L-Arm additionally comprises at least one padded tube, where the at least one padded tube has means to secure an end of the tarp, where the arm additionally comprises a Center Arm, where the center arm has a bottom and a top, and the bottom of the center arm attaches to a top of the A-frame, and the top of the center arm attaches to a bottom of the L-Arm.

5. The device of claim 4, where the center arm is adjustable.

6. The device of claim 5, where the padded tube is constructed from vinyl.

7. The device of claim 6, where the base additionally comprises a hinge rod, where the hinge rod is inserted through the last least one base knuckle and the at least one arm knuckle to allow the arm to rotate freely while being securely attached to the base, and where the hinge rod is secured by a cotter pin and an end washer.

8. A device for covering and uncovering greenhouses, comprising: a tarp, a base, an arm, a means of connecting the arm to the tarp, and a means of connecting the base to the arm, additionally comprising a Center Arm, where the center arm has a bottom and a top, and the bottom of the center arm attaches to a top of an A-frame, and the top of the center arm attaches to a bottom of an L-Arm.

9. The device of claim 8, where the center arm is adjustable.

10. The device of claim 8, additionally comprising a padded tube, where the padded tube is constructed from vinyl.

11. The device of claim 10, additionally comprising a hinge rod, where the hinge rod is inserted through at least one base knuckle and the at least one arm knuckle to allow the arm to rotate freely while being securely attached to the base.

12. The device of claim 11, where the hinge rod is secured by a cotter pin and an end washer.

* * * * *